UNITED STATES PATENT OFFICE.

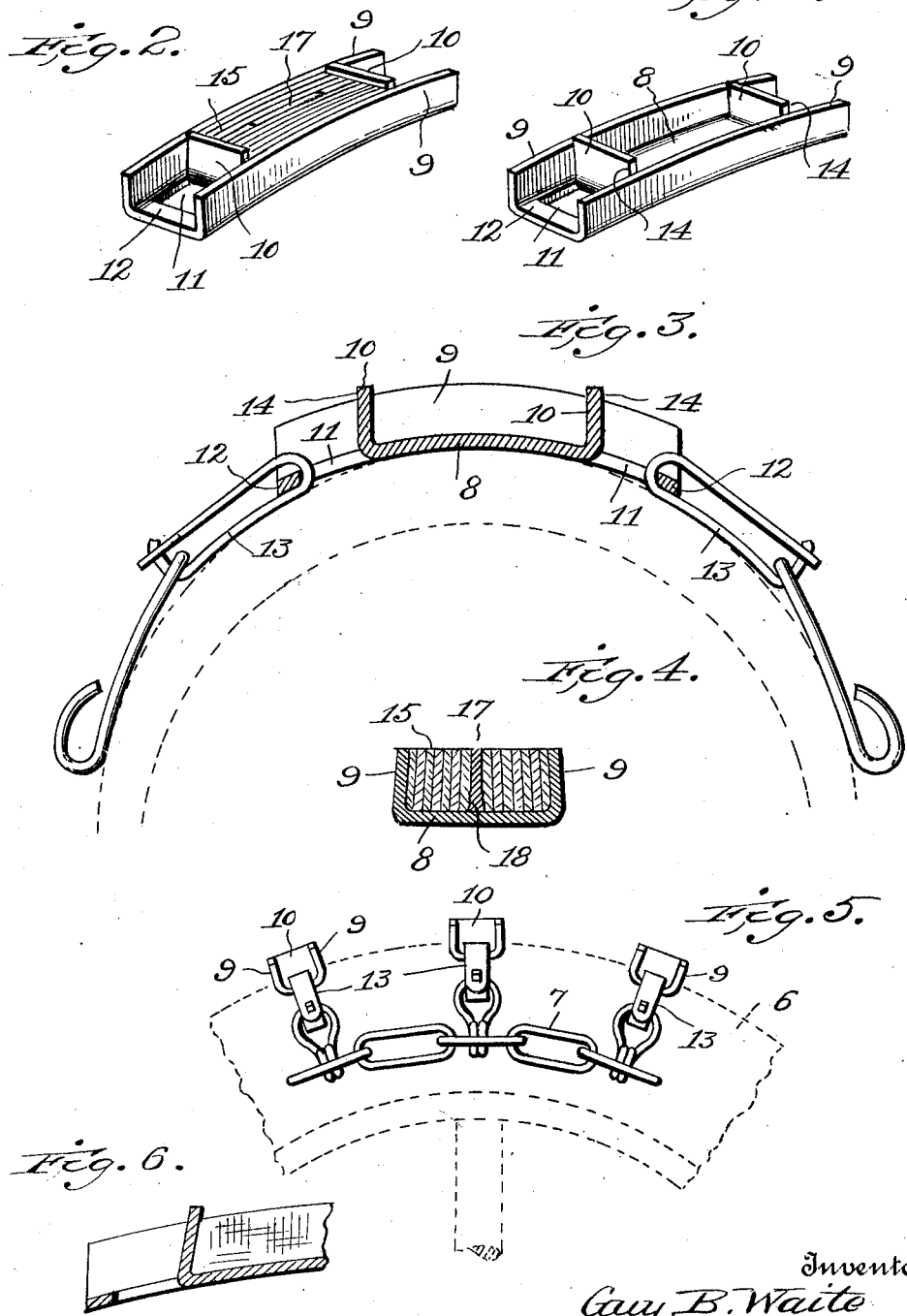

GUY B. WAITE, OF NEW YORK, N. Y.

TREAD-BLOCK FOR TIRES.

1,343,294.  Specification of Letters Patent.  Patented June 15, 1920.

Application filed March 5, 1918. Serial No. 220,600.

*To all whom it may concern:*

Be it known that I, GUY B. WAITE, a citizen of the United States, residing at New York, in the county of New York and State of New York, have invented certain new and useful Improvements in Tread-Blocks for Tires, of which the following is a specification.

This invention relates to improvements in tread-blocks for tire anti-skid devices, and has for its particular object, to provide a device which will effectually prevent skidding or slipping of the tire, both longitudinally and transversely on the roadway.

Further objects are to provide a construction which is simple and cheap to manufacture, and at the same time strong and durable.

These and other objects hereinafter set forth, are attained by the means illustrated in the accompanying drawing, in which:—

Figure 1 is a perspective view of the improved tread-block.

Fig. 2 is a like view showing the tread-block having a fabric traction member clamped therein.

Fig. 3 is a longitudinal sectional view of the device shown in Fig. 1 and showing the connecting links for holding it in position on the tire, the tire being shown in dotted lines.

Fig. 4 is a transverse sectional view of the device, as shown in Fig. 2.

Fig. 5 is a side elevation of a portion of a tire and showing in end elevation several of the tread-blocks fastened thereon, the tire being shown in dotted lines, and Fig. 6 is a detail sectional view of one end of the tread-blocks showing the manner of clamping the fabric traction member by the cross flanges.

Similar reference numerals in all of the figures of the drawing designate like parts.

This tread-block is especially adapted for use as one of the cross-links of the anti-slipping chains, as shown in Fig. 5 of the drawing, in which 6 designates the tire, and 7 a portion of one of the endless side chains which retain the cross-chains in position. It will be understood also, that the tread-blocks can be secured in position to the wheels with any other suitable attaching means.

On dirt roads, and roads covered with ice and snow, the preferable form of tread-blocks would be constructed as shown in Fig. 1 of the drawing. This construction consists of a channeled metal frame having a bottom 8 provided with outwardly extending flanges 9, which preferably extend the full length of the bottom, and also cross-flanges 10, which are preferably arranged at right-angles to the side-flanges 9, and positioned between the inner sides of said side flanges intermediate the ends of the frame. In the ends of the bottom, on the outside of the cross-flanges 10, are formed link-openings 11 which provide the cross-bars 12 to which the inner links 13 of the cross-chains are secured. A tread-block thus constructed forms a center pocket and edge pockets with one end open, the sides and end walls of the pockets being formed by the side and cross-flanges, whose edges will indent the roadway and prevent the wheel from slipping both longitudinally and transversely. The tread-blocks are preferably formed relatively narrow compared with their lengths and are adapted to lie with their lengths extending transversely of a tire, and the side-flanges are preferably of equal height throughout their lengths, so that their top edges will extend in parallel relation to the bottom of the frame. To simplify the manufacture and cheapen the cost of the tread-blocks, they are preferably formed from flat metal having the side and cross-flanges bent outwardly therefrom, and the apertures left in the metal after the cross-flanges are bent outwardly form the link openings 11 in the bottom of the blocks. While these cross-flanges would be effective in any part of the tread-blocks, they are preferably cut and bent from the metal near the ends of the block and slightly inside of the side flanges 9, so that when they are bent outwardly, the link openings 11 are formed with narrow margins of the bottom along their sides to stiffen the cut-away portions. To make said cross-flanges more effective, they are preferably cut longer than the height of the side-flanges, so that when they are bent outwardly, they will project beyond the top edges of the side-flanges, as shown clearly at 14 in Fig. 3 of the drawing.

For use on smooth and hard roadways a fabric anti-slipping traction member is preferably secured in the closed pocket of the tread-block. This anti-slipping traction member is preferably formed of layers of rubberized fabric secured together to form a fabric block which is seated edgewise in the closed pocket, and these fabric blocks are secured in the tread-blocks by bending the side-flanges or a portion thereof inwardly beyond their vertical lines and compressing the fabric blocks therebetween to form them wedge-shaped in cross section, with their wider portions engaging the bottoms of the metal blocks. This manner of securing the fabric blocks in place, prevents them from being pulled out by the frictional engagement with the roadway. It is also contemplated to retain the fabric blocks in the metal frame preferably by bending the cross-flanges 10 inwardly, and shown in Fig. 6 of the drawing. In any event, the flanges 10 prevent the endwise creeping of the fabric-blocks.

To increase the life of the fabric traction member and prevent its wearing away too rapidly, a hard metal insert 17 is interposed centrally between the fabric layers, said insert being preferably flat and thin, as shown in the drawing, and slightly shorter than the length of the fabric layers. To retain the insert 17 in position, it is slightly roughened at its lower end, as shown at 18 in Fig. 4, so when the fabric layers are compressed between the side-flanges 9, they will also be pressed against both sides of the insert in engagement with the roughened portions and also above its lower end, and thereby wedge the insert between the fabric layers.

Having thus fully described the invention, what is claimed is:—

1. A tread-block of the character described, comprising a channeled metal frame forming a bottom having outwardly extending side-flanges, and cross-flanges extending between said side-flanges intermediate the ends of said frame, said cross-flanges being cut and bent outwardly from the bottom toward the center of the block to provide link openings adjacent the ends of the block, said portions of the side-flanges lying opposite said openings forming reinforced walls for the openings.

2. A tread-block of the character described, comprising a metal channeled frame forming a bottom having outwardly extending side-flanges, integral cross-flanges cut and bent outwardly from said bottom toward its center and intermediate its ends to provide link openings at the ends of the frame, the portions of said side-flanges lying opposite to said openings forming reinforced walls for said openings, said cross-flanges and a portion of said side flanges and bottom forming a central closed pocket in said frame, and a traction member confined in said closed pocket by the inward pressure of said side-flanges.

3. A tread-block of the character described, comprising a channeled metal frame forming a bottom and outwardly extending side-flanges, a traction member formed of layers seated edgewise on said bottom and retained thereon by said side-flanges, said side-flanges adapted to compress the layers of the traction member and a metal insert interposed between the layers of said traction member and provided with means at its lower edge to be engaged by the vertical sides of the surrounding layers of the traction member to prevent its withdrawal, and connecting means formed at the ends of the tread-block to secure it in position on the tire.

In testimony whereof I affix my signature in presence of two witnesses.

GUY B. WAITE.

Witnesses:
 GLADYS R. WAITE,
 WALTER H. BUECHNER.